US010401472B2

(12) United States Patent
Ciholas et al.

(10) Patent No.: US 10,401,472 B2
(45) Date of Patent: Sep. 3, 2019

(54) SYSTEM AND METHOD FOR RANGE AND ANGLE DETERMINATION TO AN ARRAY OF RADIO RECEIVERS (71) Applicant: CIHOLAS, INC, Newburgh, IN (US)

(72) Inventors: Mike Ciholas, Evansville, IN (US); Justin E Bennett, Newburgh, IN (US)

(73) Assignee: Ciholas, Inc., Newburgh, IN (US)

(*) Notice: Subject to any disclaimer, the term of this patent is extended or adjusted under 35 U.S.C. 154(b) by 0 days.

(21) Appl. No.: 15/874,513

(22) Filed: Jan. 18, 2018

(65) Prior Publication Data
US 2019/0219664 A1 Jul. 18, 2019

(51) Int. Cl.
G01S 5/00 (2006.01)
G01S 5/04 (2006.01)
G01S 3/28 (2006.01)
G01S 3/02 (2006.01)
G01S 5/06 (2006.01)

(52) U.S. Cl.
CPC ............... *G01S 5/04* (2013.01); *G01S 3/023* (2013.01); *G01S 3/28* (2013.01); *G01S 5/06* (2013.01)

(58) Field of Classification Search
CPC ... G01S 5/04; G01S 5/06; G01S 3/023; G01S 3/28
See application file for complete search history.

(56) References Cited

U.S. PATENT DOCUMENTS

| 5,870,029 | A  | * | 2/1999  | Otto    | G08B 21/22 340/573.1 |
|-----------|----|---|---------|---------|----------------------|
| 2008/0204322 | A1 | * | 8/2008  | Oswald  | G01S 5/04 342/465    |
| 2012/0165012 | A1 | * | 6/2012  | Fischer | G01S 5/0242 455/435.1 |
| 2016/0363664 | A1 | * | 12/2016 | Mindell | G01S 7/352           |

* cited by examiner

Primary Examiner — Khai M Nguyen
(74) Attorney, Agent, or Firm — C. Richard Martin; Martin IP Law Group (57) ABSTRACT A system and method for determining the range, angle, and elevation of a target object having a radio transceiver relative to a known location is provided. The system includes a primary radio transceiver located an initially unknown distance from the target object, and at least one auxiliary radio receiver located a known distance and angle relative to a reference bearing from the primary radio transceiver. The system further includes a processing unit in communication with the primary radio transceiver and at least one auxiliary receiver. The processing unit is capable of calculating the range between the primary and the target object and the angle to the target object relative to the reference bearing. The method includes the steps of: (1) acquiring range data between at least a primary radio transceiver of the system and the target object using two way ranging; (2) transmitting the range data to a processing unit that is in communication with the primary radio transceiver and at least one auxiliary radio receiver; (3) calculating the range between the primary radio transceiver and the target object using two way ranging algorithms at the processing (Continued)

unit; (4) acquiring time of arrival data for signals exchanged between the target object and the at least one auxiliary radio receiver; and (5) determining the angle of the target object relative to a reference bearing from the primary radio transceiver of the system by running the time of arrival data from the tracked object through an algorithm.

20 Claims, 5 Drawing Sheets

SYSTEM AND METHOD FOR RANGE AND ANGLE DETERMINATION TO AN ARRAY OF RADIO RECEIVERS

BACKGROUND OF THE INVENTION

Field of the Invention

The present invention relates to location of objects using radio frequency (RF) transmissions. More specifically, the present invention relates to a system and method for range and direction determination to an array of radio receivers.

Description of the Related Art

Many existing systems that use RF transmissions to determine location within a space require static receivers dispersed throughout the space. Such systems can be time intensive to install; they require large amounts of cabling, and a complex calibration and survey. To reduce overall system cost and complexity, a method is needed to determine the location of objects within a space that is easier to setup and maintain. The system described herein reduces cost and complexity by limiting the number of receivers and eliminating the need for a detailed survey. It reduces overall setup time allowing for temporary installations that can be configured and removed for a single event. The reduced size of the system allows for installation and tracking on mobile equipment.

SUMMARY OF THE INVENTION

According to one presently preferred embodiment of the invention, there is provided a system for determining the range and direction of a target object in an unknown location relative to a known location. The system includes a radio transceiver associated with a target object; a primary radio transceiver located in a first known location; and a plurality of auxiliary radio receivers, each auxiliary receiver positioned at a known location relative to the primary radio transceiver. The system further includes a processing unit in communication with said primary radio transceiver and said plurality of auxiliary receivers. The processing unit is capable of calculating the range between the primary radio transceiver and the target object and the direction to the target object.

A further aspect of the system of the present invention provides that the primary radio transceiver and at least one auxiliary radio receiver transmit and receive ultra-wide band signals. According to one preferred configuration, the plurality of auxiliary radio receivers are arranged in a circular pattern around the primary radio transceiver. According to a further aspect of the invention, a plurality of systems may be provided and arranged in a spatially diverse pattern. According to one aspect at least three auxiliary radio receivers are provided and arranged in a spatially diverse pattern in three dimensions, and the processing unit is capable of calculating the elevation of the target object. A further aspect of the invention provides that the primary radio transceiver, plurality of auxiliary radio receivers and processing unit are packaged together into a single unit.

A further aspect of the invention provides a system for determining the range, direction and elevation of a target object in an unknown location relative to a known location. A system according to this aspect includes a target object having a radio transceiver, a primary radio transceiver located in a first known location, and at least three auxiliary radio receivers. Each auxiliary receiver is positioned at a known location relative to the primary radio transceiver. A processing unit is provided in communication with the primary radio transceiver and the plurality of auxiliary receivers, and is capable of calculating the range between the primary radio transceiver and the target object, the direction to the target object, and the elevation of the target object.

According to another presently preferred embodiment of the invention, a method for determining the range and direction of a target object relative to a known location is provided. The method includes the steps of: (a) acquiring timing data of transmit and receive times of packets between at least a primary radio transceiver located in a first known coordinate location and the target object; (b) calculating a first distance ($d_{tp}$) between the primary radio transceiver and the target object based on the acquired timing data using two way ranging algorithms; (c) acquiring time of arrival data for signals exchanged between the target object and the primary radio transceiver and between the target object and each of a plurality of auxiliary radio receivers positioned at a known coordinate location relative to the primary radio transceiver; (d) selecting an arbitrary point $x_n$ on an arc located at the first distance ($d_{tp}$) from the primary radio transceiver; (e) computing the estimated time of arrival data for signals between the arbitrary point $x_n$ and said primary radio transceiver and between the arbitrary point $x_n$ and each of said plurality of auxiliary radio receivers based on the known coordinate location of the arbitrary point $x_n$, the known coordinate location of the primary radio transceiver, and the known coordinate locations of the plurality of auxiliary radio receivers; (f) comparing the actual measured time of arrival data for the target object to the estimated time of arrival data for the arbitrary point $x_n$; (g) determining whether the estimated time of arrival data for the arbitrary point $x_n$ is within an acceptable margin of error to the actual measured time of arrival data for the target object; (h) if the estimated time of arrival data for the arbitrary point $x_n$ is not within the acceptable margin of error, selecting a further arbitrary point $x_{n+1}$ along the arc; and (i) repeating steps e-h for each further arbitrary point $x_{n+1}$ until an acceptable margin of error is reached.

The step of selecting a further arbitrary point $x_{n+1}$ along the arc may further comprise the steps of: comparing the acquired timing data of transmit and receive time packets to the computed estimated time of arrival data for each auxiliary radio transceiver; generating a vector from the point $x_n$ for each auxiliary radio receiver indicative of the magnitude of the difference between acquired timing data and the computed estimated time of arrival data; summing the vectors generated to obtain a resulting vector; and selecting the next arbitrary point $x_{n+1}$ along the arc in the direction of the resulting vector.

Further, the method according to this aspect of the invention may include a processing unit that is in communication with the primary radio transceiver and the plurality of auxiliary radio receivers to make the calculations and computations based on the timing data.

According to one aspect of the invention, the step of selecting the arbitrary point $x_n$ is preceded by ascertaining which one of the plurality of auxiliary radio receivers is nearest the target object. Also according to this aspect, the step of selecting the arbitrary point $x_n$ includes selecting a point on the arc closest to the nearest auxiliary radio receiver.

According to a further aspect of the invention, there is provided the further steps of storing the determined position of the target object after the acceptable margin of error is reached; and re-checking the angle of the target object to the primary radio transceiver by beginning with the stored position of the target object instead of the arbitrary point in step (d).

A further aspect of the invention provides that there are at least three auxiliary radio receivers arranged in a spatially diverse pattern in three dimensions and the arc is a three-dimensional sphere. Yet another aspect of the invention is to select the positions of the primary radio transceiver and plurality of auxiliary radio receivers to optimize angular accuracy in one or more directions to optimize accuracy for a particular area. Another aspect provides that the time of arrival data for signals exchanged between the target object and each of a plurality of auxiliary radio receivers are assigned a weight based on signal quality.

According to another presently preferred embodiment of the invention, a method for determining the range, direction and elevation of a target object in three dimensions relative to a known location is provided. The method includes the steps of: (a) acquiring timing data of transmit and receive times of packets between at least a primary radio transceiver located in a first known location and the target object; (b) calculating a first distance ($d_{tp}$) between the primary radio transceiver and the target object based on the acquired timing data using two way ranging algorithms; (c) acquiring time of arrival data for signals exchanged between the target object and said primary radio transceiver and between the target object and each of at least three auxiliary radio receivers positioned at a known coordinate location relative to the primary radio transceiver and arranged in a spatially diverse pattern in three dimensions; (d) selecting an arbitrary point $x_n$ on a sphere located at the first distance ($d_{tp}$) from the primary radio transceiver; (e) computing the estimated time of arrival data for signals between the arbitrary point $x_n$ and said primary radio transceiver and between the arbitrary point $x_n$ and each of said at least three auxiliary radio receivers based on the known coordinate location of the arbitrary point $x_n$, the known coordinate location of the primary radio transceiver, and the known coordinate locations of each of the at least three auxiliary radio receivers; (f) comparing the actual measured time of arrival data for the target object to the estimated time of arrival data for the arbitrary point $x_n$; (g) determining whether the estimated time of arrival data for the arbitrary point $x_n$ is within an acceptable margin of error to the actual measured time of arrival data for the target object; (h) if the estimated time of arrival data for the arbitrary point $x_n$ is not within the acceptable margin of error, selecting a further arbitrary point $x_{n+1}$ along the sphere, preferably nearer to the target object, and (i) repeating steps e-h for each further arbitrary point $x_{n+1}$ until an acceptable margin of error is reached.

The step of selecting a further arbitrary point $x_{n+1}$ along the arc may further comprise the steps of: comparing the acquired timing data of transmit and receive time packets to the computed estimated time of arrival data for each auxiliary radio transceiver; generating a vector from the point $x_n$ for each auxiliary radio receiver indicative of the magnitude of the difference between acquired timing data and the computed estimated time of arrival data; summing the vectors generated to obtain a resulting vector; and selecting the next arbitrary point $x_{n+1}$ along the arc in the direction of the resulting vector.

Further, the method according to this aspect of the invention may include a processing unit that is in communication with the primary radio transceiver and the plurality of auxiliary radio receivers to make the calculations and computations based on the timing data.

According to a further aspect of the 3D method, the step of selecting the arbitrary point $x_n$ is preceded by ascertaining which one of the three or more auxiliary radio receivers is nearest the target object; and the step of selecting the arbitrary point $x_n$ includes selecting a point on the sphere that is closest to the nearest auxiliary radio receiver.

According to a further aspect of the 3D method of the invention, there is provided the further steps of storing the determined position of the target object after the acceptable margin of error is reached; and re-checking the angle of the target object to the primary radio transceiver by beginning with the stored position of the target object instead of the arbitrary point in step (d).

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 1:
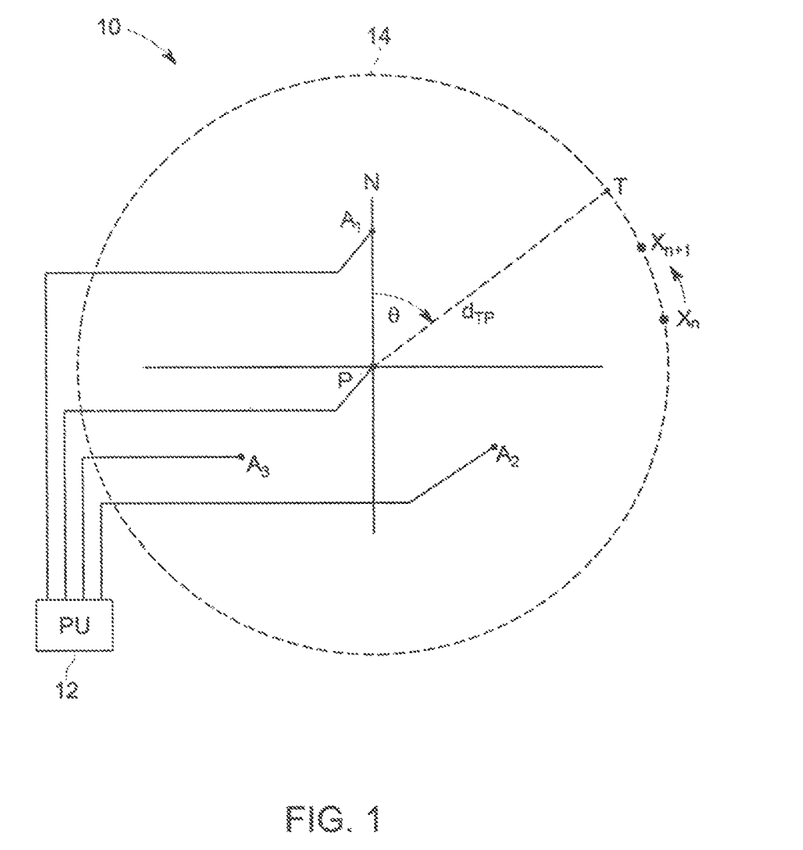
FIG. 1 is a schematic representation of a system for range and angle determination of a target object to an array or radio receivers according to one presently preferred embodiment of the invention.

As best shown in FIG. 1, one presently preferred embodiment of the invention comprises a system 10 for range and direction determination of a target object T to an array of radio devices P, $A_1$, $A_2$, $A_3$. The system according to a presently preferred embodiment comprises a primary radio transceiver P and a plurality of auxiliary radio receivers $A_1$, $A_2$, $A_3$ arranged in a spatially diverse known pattern. The primary radio receiver and plurality of auxiliary radio transceivers are capable of transmitting and receiving radio signals with precise timing, and, according to one presently preferred embodiment are ultra-wide-band (UWB) transceivers and receivers. While the preferred embodiment shown in FIG. 1 shows three auxiliary UWB radio receivers $A_1$, $A_2$, $A_3$ arranged in a substantially circular pattern a distance r from a centrally positioned primary UWB radio transceiver P, any spatially diverse pattern wherein the locations of the devices is known may be utilized. Also, while the embodiment shown in FIG. 1 shows three (3) auxiliary UWB radio receivers $A_1$, $A_2$, $A_3$, any configuration of two or more auxiliary radio receivers with a primary radio transceiver will provide results in two-dimensional space. Where a target object T is to be located in a three-dimensional space, at least three (3) auxiliary radio receivers are used along with the primary radio transceiver P.

Each of the primary UWB radio transceiver P and auxiliary UWB radio receivers $A_1$, $A_2$, $A_3$ are connected to a processing unit (PU) 12. While FIG. 1 shows the radio devices P, $A_1$, $A_2$, $A_3$ being hardwired to the PU 12, it is within the scope of the invention to allow the radio devices P, $A_1$, $A_2$, $A_3$ to wirelessly communicate with the PU 12.

The system 10 is used to determine the position of a target object T having a previously unknown location. The target object T also includes a UWB radio transceiver for transmitting and receiving radio signals. Range between the system 10 and the target object T can be determined using standard Two-Way Ranging (TWR). Direction or bearing to the target object T is then determined by using the time of arrival (ToA) data from the tracked object T through process herein described.

Two way ranging (TWR) is used specifically to determine the distance $d_{tp}$ between the target object T and the primary radio transceiver P of the system 10. This part of the process is similar to that disclosed in applicant's U.S. Pat. No. 9,709,663 issued on Jul. 18, 2017, the subject matter of which is incorporated herein by reference.

Figure 2A:
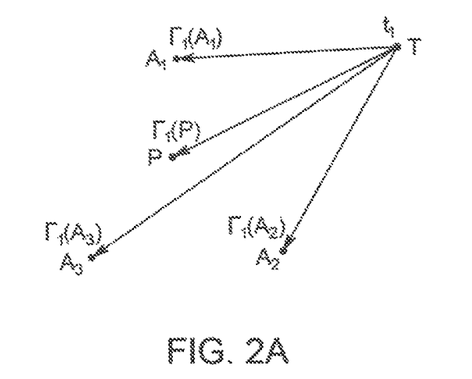
FIG. 2A is a graphic time delay representation of the first of three transmissions of data packets between the target object T, primary node P and auxiliary nodes $A_1$, $A_2$, $A_3$ of the system shown in FIG. 1, showing transmission time $t_1$, the reception time $r_{1(p)}$ at the primary node, and the reception time $r_{1(a)}$ at the auxiliary node $A_n$.
Figure 2B:
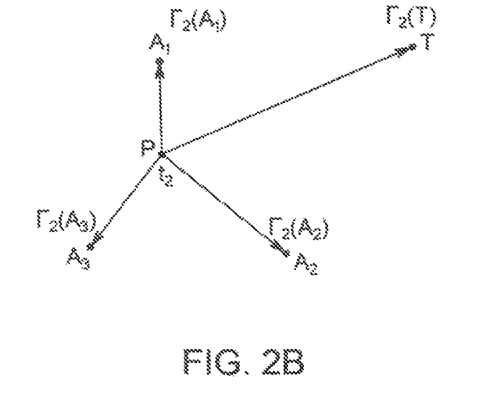
FIG. 2B is a graphic time delay representation of the second of three transmissions of data packets between the target object T, primary node P and auxiliary nodes $A_1$, $A_2$, $A_3$ of the system shown in FIG. 1, showing transmission time $t_2$, the reception time at target object $r_{2(t)}$, and the reception time $r_{2(a)}$ at the auxiliary node $A_n$.
Figure 2C:
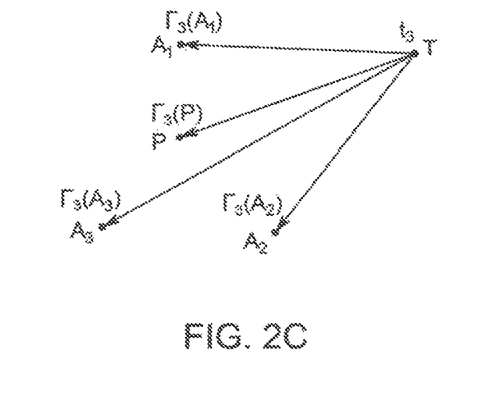
FIG. 2C is a graphic time delay representation of the third of three transmissions of data packets between the target object T, primary node P and auxiliary nodes $A_1$, $A_2$, $A_3$ of the system shown in FIG. 1, showing transmission time $t_3$, the reception time $r_{3(p)}$ at the primary node, and the reception time $r_{3(a)}$ at the auxiliary node $A_n$.

A series of three packets are exchanged between the target object T and the primary radio transceiver P. FIGS. 2A, 2B and 2C shows a notional representation of the three packet transmissions and timing. As best shown in FIG. 2A, time $t_1$ is the transmit time for the first packet transmitted by target object T as measured in the time base of the target object T. Time $r_{1(p)}$ is the reception time for the first packet at the primary radio transceiver P as measured in the time base of the primary transceiver. Similarly, times $r_{1(A1)}$, $r_{1(A2)}$, $r_{1(A3)}$ are the reception times, respectively, for the first packet at the first, second and third auxiliary radio receivers $A_1$, $A_2$, $A_3$.

As shown in FIG. 2B, time $t_2$ is the transmit time for the second packet transmitted by primary radio transceiver P as measured in the time base of the primary transceiver P. Time $r_{2(t)}$ is the reception time for the second packet at the target object T as measured in the time base of the target object T. Similarly, times $r_{2(A1)}$, $r_{2(A2)}$, $r_{2(A3)}$ are the reception times, respectively, for the second packet at the first, second and third auxiliary radio receivers $A_1$, $A_2$, $A_3$.

Finally, as shown in FIG. 2C, time $t_3$ is the transmit time for the third packet transmitted by target object T as measured in the time base of the target object T. Time $r_{3(p)}$ is the reception time for the third packet at the primary radio transceiver P as measured in the time base of the primary radio transceiver. Similarly, times $r_{3(A1)}$, $r_{3(A2)}$, $r_{3(A3)}$ are the reception times, respectively, for the third packet at the first, second and third auxiliary radio receivers $A_1$, $A_2$, $A_3$.

To produce a distance between the target object T and primary radio transceiver P, the packet timings are combined in the equation below, where C is the speed of light and $d_{tp}$ is the output distance between the target object T and the primary radio transceiver P.

$$dtp = C\frac{(t_2 - t_1) - (r_{2(t)} - r_{1(p)}) + (r_{3(p)} - r_{2(t)}) - (t_3 - t_2)}{4}$$

In the above equation, the distance $d_{tp}$ is obtained between the target object T and the primary transceiver P. Since the auxiliary radio receivers $A_1$, $A_2$, $A_3$ are in known locations, the distances between the primary radio transceiver P and each auxiliary radio receiver $A_1$, $A_2$, $A_3$ is also known.

Next, the direction, which in the case of the two-dimensional model is the bearing, to the target object T is determined. This is done in relation to a known reference bearing (e.g. North (N) as shown in FIG. 1). It is also known that the target object T is located somewhere along the arc 14 of a circle or arc at distance $d_{tp}$ from the primary radio transceiver P.

The process of determining the bearing begins by selecting an arbitrary point (i.e. $x_n$) on the arc 14. Next, given the coordinates of the arbitrary point $x_n$, the estimated times $t_1$, $t_2$, $t_3$, $r_{1(p)}$, $r_{3(p)}$, $r_{1(a)}$, $r_{3(a)}$, $r_{2(t)}$, $r_{2(a)}$ are computed by using the formula $$t(est) = t(trans) + \frac{d(est)}{C}$$

For example, to calculate the estimated time of travel ($t_{(est)}$) from $x_n$ to $A_1$, the distance between $A_1$ to $x_n$ ($d_{(est)}$) must be calculated. Because all the points P, $A_1$ and $x_n$ are in known locations, the x,y coordinates of each are known. Thus, the distance between $A_1$ and $x_n$ ($d_{(est)}$) can be calculated using the distance formula:

$$d(est) = \sqrt{(x2-x1)+(y2-y1)}$$

where $x_2$, $y_2$ are the coordinates of point $A_1$ and $x_1$,$y_1$ are the coordinates of point $x_n$. In this example $t_{(trans)}$ would be the transmit time from the target object (either $t_1$ or $t_3$). Using this same logic and formula $d_{(est)}$ may also be calculated for the distance between $A_2$ and $x_n$, and the distance between $A_3$ and $x_n$, and then used to determine $t_{(est)}$ for each.

Those estimated times are then compared to the actual measured times for the target object T. If the difference between the estimated times and the measured times is not within the level of acceptable error, a second arbitrary point $x_{n+1}$ is selected along the arc 14 and the estimated times for the second arbitrary point are computed as above and compared again to the measured times. Based on the data, the second arbitrary point $x_{n+1}$ is selected to be at a point along the arc 14, preferably in the direction of the target object T.

Since the coordinate location of the target object T is still unknown at this point, the known transmission times from the data collected from the actual transmissions between the target object T and the primary transceiver P and auxiliary receivers $A_1$, $A_2$, $A_3$ are compared to the calculated estimated times of travel ($t_{(est)}$). For example, consider the transmissions to and from auxiliary node $A_1$. The actual time of travel $t_{(act)}$ for the first transmission between T and $A_1$ is $r_{1(A1)}-t_1$ and is known from the data collected. Thus, if $t_{(est)}$ from $x_n$ to $A_1$ is greater than $t_{(act)}$ from T to $A_1$, a vector is generated from the point $x_n$ of the magnitude of the difference and a direction along the arc 14 toward a point that is nearer to auxiliary receiver $A_1$. Conversely, if $t_{(est)}$ from $x_n$ to $A_1$ is less than $t_{(act)}$ from T to $A_1$, a vector is generated of the magnitude of the difference and a direction along the arc 14 toward a point that is further from auxiliary receiver $A_1$. This process is repeated for each additional auxiliary receiver $A_2$, $A_3$, and vectors of the magnitude of the difference in the respective direction are generated for each. The resulting vectors are then summed, which, in the case of the embodiment shown in FIG. 1 would be the sum of the vectors for $A_1$, $A_2$, and $A_3$. The next arbitrary point $x_{n+1}$ is then selected along the arc 14 in the direction of the resulting vector.

This iterative process is repeated (i.e. selection of additional arbitrary points $x_{n+2}$, $x_{n+3}$, $x_{n+4}$, $x_{n+5}$ . . . ) until the estimated times for the selected arbitrary point are within the predetermined level of acceptable error in relation to the measured times. Once the estimated times and the measured times are within the predetermined level of acceptable error, the positon of the target object T is established and the iterative process is terminated.

Several enhancements to the basic system and process are also within the scope of the invention. Once the initial positon of the target object T has been ascertained, the system can store that value and start at that point the next time the position is to be determined. This is especially useful in tracking moving objects and reduces the overall processing time. In addition, the selection of the first arbitrary point $x_n$ can be improved by ascertaining which of the auxiliary radio receivers $A_1$, $A_2$, $A_3$ has the shortest distance $d_{at}$ to the target object T and then selecting the first arbitrary point $x_n$ at a location along the arc 14 between that closest auxiliary radio receiver ($A_1$ in the example shown in FIG. 1) and the target object T. Furthermore, in the case of a moving target object T, after several measurements are taken, the data can be used to model velocity and direction of the target object T thereby creating a motion model of the target object T which can also be used to enhance the selection of the first arbitrary point $x_n$ each time a new measurement is taken.

Figure 3:
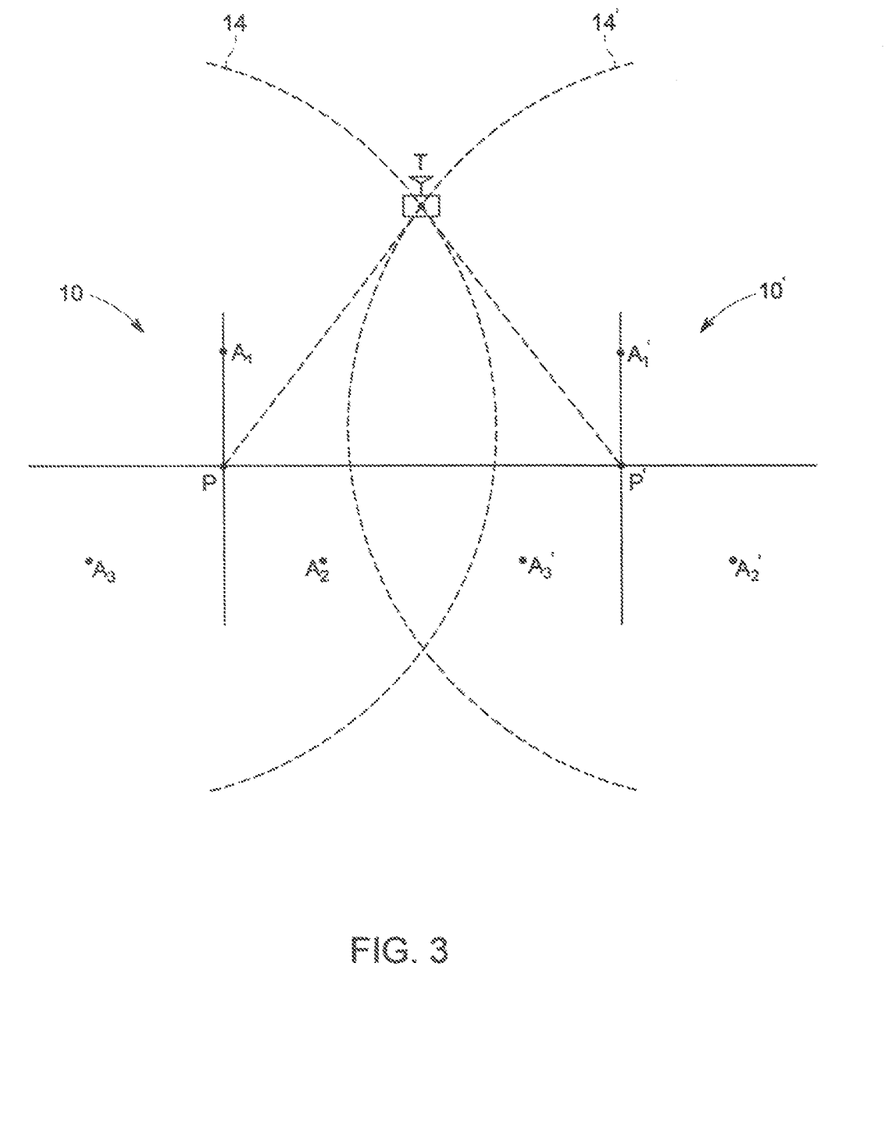
FIG. 3 is a schematic representation of an alternative system for range and angle determination of a target object to an array of radio receivers employing two such systems according to one presently preferred embodiment of the invention.

Multiple systems can be combined in a spatially diverse array to extend the overall range of the system. By way of example, and as shown in FIG. 3, dual systems 10, 10' can be used to extend the range of the overall system. The dual system embodiment also provides improved accuracy in areas where the two systems overlap.

In a system such as one of the present invention, the accuracy of the output can be increased by applying weighting to each of the auxiliary radio receivers based off quality information for transmissions. For example, in the present invention, the arc 14 upon which the target object T is located is a calculated distance ($d_{tp}$) from the primary radio transceiver P, as provided by TWR. The next step in the process of the present invention is to estimate or guess an arbitrary point $x_n$ on the arc 14, and calculate an error to the radio transceiver P, and each of the radio receivers $A_1$, $A_2$, $A_3$, etc. provided the arbitrary point $x_n$ as an input. If the estimated times are not within the predetermined level of acceptable error relative to the actual measured times, another arbitrary point $x_{n+1}$ is selected along the arc 14 either toward or away from one of the auxiliary radio receivers $A_1$, $A_2$, $A_3$ based off the magnitude of the error.

If quality information regarding the last transmission, such as received signal strength, is available, a weight is assigned to each auxiliary radio receiver $A_1$, $A_2$, $A_3$ from 0-1.0 based on the quality of the signal. A 'better' auxiliary node would receive a weight closer to 1 and a 'worse' auxiliary radio receiver would receive a weight closer to 0. That weight is then multiplied by the magnitude of the error before the errors are added together to render a final direction. The weight factor can then be combined with the resultant vector as discussed above to assess how far along the arc 14 in the direction of the resultant vector to select the next arbitrary point.

To give an example, suppose a system of three auxiliary radio receivers $A_1$, $A_2$, $A_3$. Auxiliary radio receivers $A_1$ and $A_2$ record a good RSSI for the reception of their data and $A_3$ records a bad RSSI. A weight of 1.0 is assigned to $A_t$ and $A_2$, and a weight of 0.1 is assigned to $A_3$. After calculating the magnitude of the error to $A_t$ and $A_2$, the weighting may suggest moving a short distance, say 30 cm, closer, where $A_3$ (because the data is bad) would suggest moving a larger distance, say 100 cm, closer. Taking the assigned weight into account:

with weight: ((1.0*30 cm)+(1.0*30 cm)+(0.1*100 cm))/3=>23.3 cm w/o weight: (30 cm+30 cm+100 cm)/3=>53.33 cm Taking into account the weighting, the subsequent arbitrary point $x_{n+1}$ can be selected at a much more reasonable distance and will ultimately result in a better final output. The bad data from anchor $A_3$ has been de-weighted and isn't contributing as much to the final solution.

According to this aspect of the invention, there are a number of different parameters that can be used to determine the weight assigned to a given auxiliary node, including:

RSSI for first path signal

RSSI for total path of the signal

Historic data collected for this auxiliary node (ie., maybe it's only receiving half of the packets from the given target object)

Knowledge of the environment (ie., there is a wall between the anchor and the position being evaluated) RSSI value for all three packets, not just the first.

The above parameters can be used in isolation or in conjunction with one another. Anything that provides information regarding the quality of the transmission can be used to weight the data from that anchor or node and thus improve the final output.

Figure 4A:
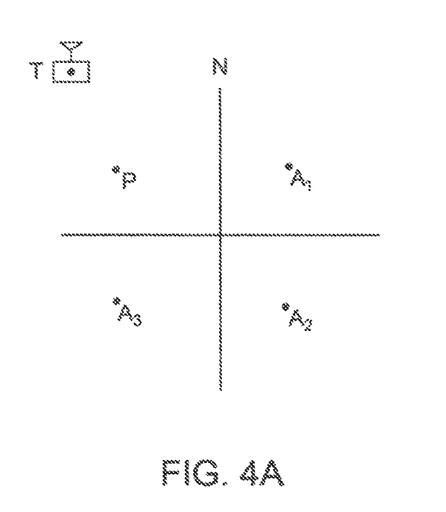
FIG. 4A is a schematic representation of a system for range and angle determination of a target object to an array of radio receivers according to yet another alternative embodiment of the invention that does not require a central node and wherein the primary and auxiliary nodes are arranged in a geometric pattern.
Figure 4B:
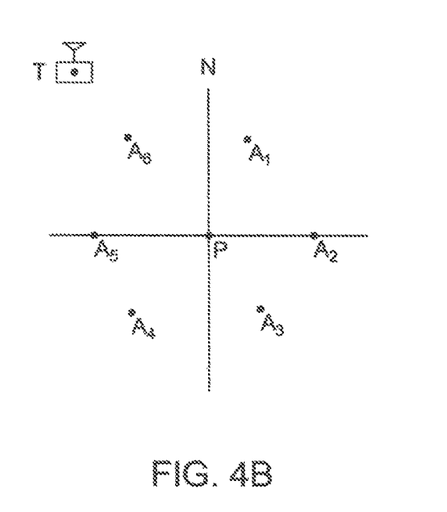
FIG. 4B is a schematic representation of a system for range and angle determination of a target object to an array of radio receivers according to yet another alternative embodiment of the invention that does not require a central node and wherein the auxiliary nodes are arranged in a circular pattern around the central primary node.
Figure 4C:
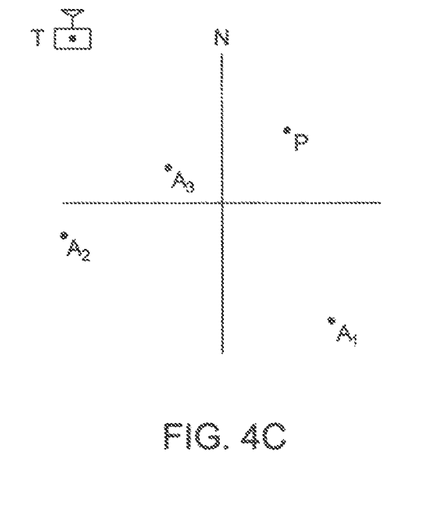
FIG. 4C is a schematic representation of a system for range and angle determination of a target object to an array of radio receivers according to yet another alternative embodiment of the invention that does not require a central node and wherein the primary and auxiliary nodes are arranged in a random pattern.
Figure 4D:
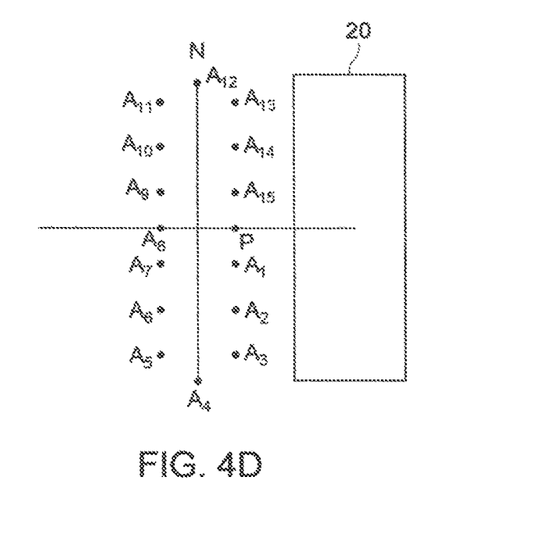
FIG. 4D is a schematic representation of a system for range and angle determination of a target object to an array of radio receivers according to yet another alternative embodiment of the invention that does not require a central node and wherein the primary and auxiliary nodes are arranged in a pattern optimized for a scanning a particular zone.

While it is preferred to have the primary node P located in a central location as shown in FIG. 1, the primary node P only need operate as a primary node and does not necessarily need to be located in a central positon. As shown in FIG. 4A-FIG. 4D, the nodes can be positioned in alternative arrangements such as a square (FIG. 4A), a circle with a central primary node P and an array of six (6) auxiliary nodes $A_1$, $A_2$, $A_3$, $A_4$, $A_5$, $A_6$ arranged in a circular pattern around the primary node (FIG. 4B), or in an arbitrary pattern (FIG. 4C). In each instance, one of the nodes acts as a primary node P for purposes of the measurements and calculations discussed above, regardless of its position relative to the other auxiliary nodes. In addition, the array of nodes can be laid out based on a particular area to be measured to optimize the system, such as for optimizing angular accuracy in one or more directions. For example, the array shown in FIG. 4D would have angular accuracy optimized on the left and right sides where an area 20 to be monitored may be located.

Figure 5:
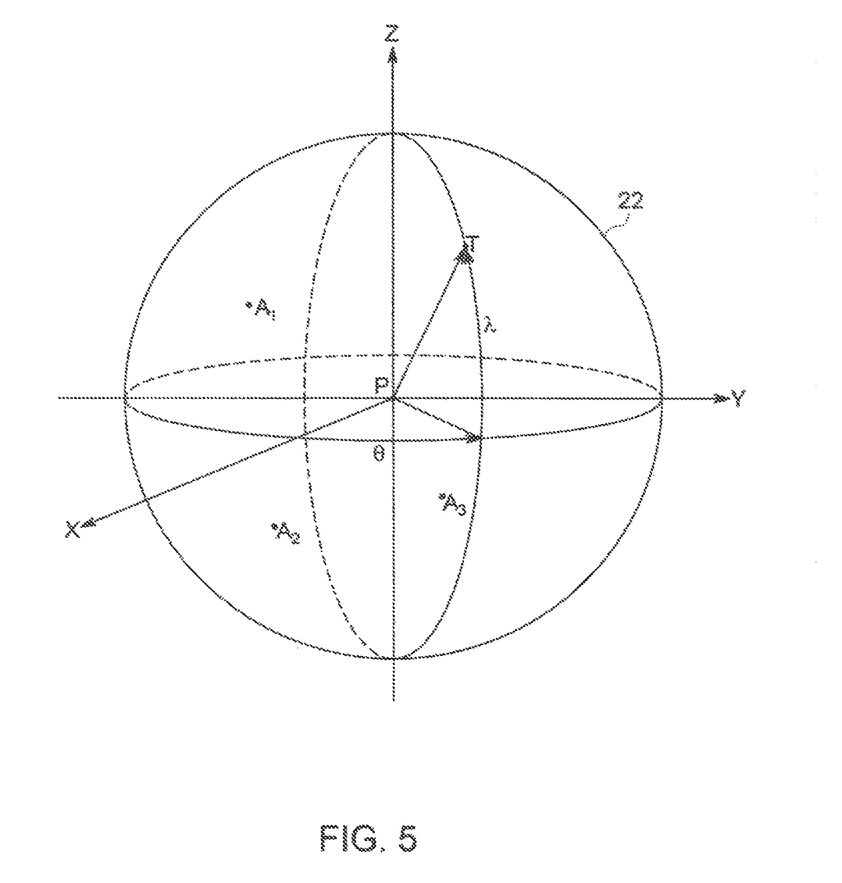
FIG. 5 is a schematic representation of a system for range and angle determination of a target object to an array of radio receivers in three dimensions according to one presently preferred embodiment of the invention.

A further embodiment of the method for determining the range and angle of a target object in three dimensions relative to a known location is shown in FIG. 5. According the method of this embodiment of the invention, timing data between at least a primary radio transceiver P located in a first known location and the target object T located in an initially unknown location is acquired using two way ranging. Next, a first distance ($d_{tp}$) between the primary radio transceiver P and the target object T is calculated based on the acquired timing data using two way ranging algorithms. Time of arrival data is then acquired for signals exchanged between the target object T and said primary radio transceiver P and between the target object T and each of at least three auxiliary radio receivers $A_1$, $A_2$, $A_3$ arranged in a spatially diverse pattern in three dimensions.

Next, an arbitrary point $x_n$ is selected on a sphere 22 located at the first distance ($d_{tp}$) from the primary radio transceiver P. The estimated time of arrival data for signals between the arbitrary point $x_n$ and said primary radio transceiver P and between the arbitrary point $x_n$ and each of said at least three auxiliary radio receivers $A_1$, $A_2$, $A_3$ is then computed based on the known coordinates of the arbitrary point $x_n$, the known coordinates of the primary radio transceiver P, and the known coordinates of each of the at least three auxiliary radio receivers $A_1$, $A_2$, $A_3$. The actual measured time of arrival data for the target object T is then compared to the estimated time of arrival data for the arbitrary point $x_n$, and it is determined whether the estimated time of arrival data for the arbitrary point $x_n$ is within an acceptable margin of error to the actual measured time of arrival data for the target object T.

If the estimated time of arrival data for the arbitrary point $x_n$ is not within the acceptable margin of error, a further arbitrary point $x_{n+1}$ along the sphere 22 is selected. The process for selecting the further arbitrary point is the same as discussed above with the exception that the z axis coordinates must be included in the calculation. Accordingly, the process will not be further described here. As with the 2-D model, the steps of this iterative process are repeated for each further arbitrary point $x_{n+1}$ until an acceptable margin of error is reached.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A system for determining the range and direction of a target object in an unknown location relative to a locator unit comprising:
   a. a radio transceiver associated with the target object;
   b. a locator unit comprising:
      i. a primary radio transceiver located in a first known location on the locator unit;
      ii. a plurality of auxiliary radio receivers, each auxiliary receiver positioned at a known location on the locator unit relative to the primary radio transceiver;
   c. a processing unit in communication with said primary radio transceiver and said plurality of auxiliary receivers, said processing unit capable of calculating the range between the primary radio transceiver and the target object, and the direction to the target object.

2. The system for determining the range and direction of a target object according to claim 1 wherein the primary radio transceiver and said plurality of auxiliary radio receivers transmit and receive ultra-wideband signals.

3. The system for determining the range and direction of a target object according to claim 1 wherein the plurality of auxiliary radio receivers are arranged in a circular pattern around the primary radio transceiver.

4. The system for determining the range and direction of a target object according to claim 1 wherein a plurality of systems are provided and arranged in a spatially diverse pattern.

5. The system for determining the range and direction of a target object according to claim 1 wherein said plurality of auxiliary receivers comprises at least three auxiliary radio receivers arranged in a spatially diverse pattern in three dimensions, and said processing unit is capable of calculating the elevation of the target object.

6. A system for determining the range, direction and elevation of a target object in an unknown location relative to a locator unit comprising:
   a. a target object having a radio transceiver;
   b. a locator unit comprising:
      i. a primary radio transceiver located in a first known location on the locator unit;
      ii. at least three auxiliary radio receivers, each auxiliary receiver positioned at a known location on the locator unit relative to the primary radio transceiver;
   c. a processing unit in communication with said primary radio transceiver and said plurality of auxiliary receivers, said processing unit capable of calculating the range between the primary radio transceiver and the target object, the direction to the target object, and the elevation of the target object.

7. The system for determining the range, direction and elevation of a target object according to claim 6 wherein the primary radio transceiver and at least three auxiliary radio receivers transmit and receive ultra-wideband signals.

8. A method for determining the range and direction of a target object relative to a known location comprising the steps of:

a. acquiring timing data of transmit and receive times of packets between at least a primary radio transceiver located in a first known coordinate location and the target object;
b. calculating a first distance ($d_{tp}$) between the primary radio transceiver and the target object based on the acquired timing data using two way ranging algorithms;
c. acquiring time of arrival data for signals exchanged between the target object and said primary radio transceiver and between the target object and each of a plurality of auxiliary radio receivers positioned at a known coordinate location relative to the primary radio transceiver;
d. selecting an arbitrary point $x_n$ on an arc located at the first distance ($d_{tp}$) from the primary radio transceiver;
e. computing the estimated time of arrival data for signals between the arbitrary point $x_n$ and said primary radio transceiver and between the arbitrary point $x_n$ and each of said plurality of auxiliary radio receivers based on the known coordinate location of the arbitrary point $x_n$, the known coordinate location of the primary radio auxiliary radio receivers;
f. comparing the actual measured time of arrival data for the target object to the estimated time of arrival data for the arbitrary point $x_n$;
g. determining whether the estimated time of arrival data for the arbitrary point $x_n$ is within an acceptable margin of error to the actual measured time of arrival data for the target object;
h. if the estimated time of arrival data for the arbitrary point $x_n$ is not within the acceptable margin of error, selecting a further arbitrary point $X_{n+1}$ along the arc;
i. repeating steps e-h for each further arbitrary point $X_{n+1}$ until an acceptable margin of error is reached.

9. The method for determining the range and direction of a target object according to claim 8 wherein the step of selecting a further arbitrary point $X_{n+1}$ along the arc comprises the steps of:
a. comparing the acquired timing data of transmit and receive time packets to the computed estimated time of arrival data for each auxiliary radio transceiver;
b. generating a vector from the point $x_n$ for each auxiliary radio receiver indicative of the magnitude of the difference between acquired timing data and the computed estimated time of arrival data;
c. summing the vectors generated to obtain a resulting vector;
d. selecting the next arbitrary point $X_{n+1}$ along the arc in the direction of the resulting vector.

10. The method for determining the range and direction of a target object according to claim 8 wherein a processing unit that is in communication with the primary radio transceiver and said plurality of auxiliary radio receivers is provided to make the calculations and computations based on the timing data.

11. The method for determining the range and direction of a target object according to claim 8 wherein the step of selecting the arbitrary point $x_n$ is preceded by ascertaining which one of the plurality of auxiliary radio receivers is nearest the target object; and the step of selecting the arbitrary point $x_n$ includes selecting a point on the arc that is closest to the nearest auxiliary radio receiver.

12. The method for determining the range and direction of a target object according to claim 8 further comprising the steps of:

a. storing the determined position of the target object after the acceptable margin of error is reached; and
b. re-checking the angle of the target object to the primary radio transceiver by beginning with the stored position of the target object instead of the arbitrary point in step (d).

13. The method for determining the range and direction of a target object according to claim 8, wherein said plurality of auxiliary radio receivers comprises at least three auxiliary radio receivers arranged in a spatially diverse pattern in three dimensions and said arc is a three-dimensional sphere.

14. The method for determining the range and direction of a target object according to claim 8 wherein the positions of the primary radio transceiver and plurality of auxiliary radio receivers are selected to optimize angular accuracy in one or more directions to optimize accuracy for a particular area.

15. The method for determining the range and direction of a target object according to claim 8 wherein the time of arrival data for signals exchanged between the target object, the primary radio transceiver, and each of a plurality of auxiliary radio receivers is assigned a weight based on signal quality.

16. A method for determining the range, direction and elevation of a target object in three dimensions relative to a known location comprising the steps of:
a. acquiring timing data of transmit and receive times of packets between at least a primary radio transceiver located in a first known location and the target object;
b. calculating a first distance ($d_{tp}$) between the primary radio transceiver and the target object based on the acquired timing data using two way ranging algorithms;
c. acquiring time of arrival data for signals exchanged between the target object and said primary radio transceiver and between the target object and each of at least three auxiliary radio receivers positioned at a known coordinate location relative to the primary radio transceiver and arranged in a spatially diverse pattern in three dimensions;
d. selecting an arbitrary point $x_n$ on a sphere located at the first distance ($d_{tp}$) from the primary radio transceiver;
e. computing the estimated time of arrival data for signals between the arbitrary point $x_n$ and said primary radio transceiver and between the arbitrary point $x_n$ and each of said at least three auxiliary radio receivers based on the known coordinate location of the arbitrary point $x_n$, the known coordinate location of the primary radio transceiver, and the known coordinate locations of each of the at least three auxiliary radio receivers;
f. comparing the actual measured time of arrival data for the target object to the estimated time of arrival data for the arbitrary point $x_n$;
g. determining whether the estimated time of arrival data for the arbitrary point $x_n$ is within an acceptable margin of error to the actual measured time of arrival data for the target object;
h. if the estimated time of arrival data for the arbitrary point $x_n$ is not within the acceptable margin of error, selecting a further arbitrary point $X_{n+1}$ that is nearer the target object along the sphere than the previous arbitrary point $x_n$;
i. repeating steps e-h for each further arbitrary point $X_{n+1}$ until an acceptable margin of error is reached.

17. The method for determining the range and direction of a target object according to claim 16 wherein the step of selecting a further arbitrary point $X_{n+1}$ along the arc comprises the steps of:

a. comparing the acquired timing data of transmit and receive time packets to the computed estimated time of arrival data for each auxiliary radio transceiver;

b. generating a vector from the point $x_n$ for each auxiliary radio receiver indicative of the magnitude of the difference between acquired timing data and the computed estimated time of arrival data;

c. summing the vectors generated to obtain a resulting vector;

d. selecting the next arbitrary point $X_{n+1}$ along the arc in the direction of the resulting vector.

18. The method for determining the range, direction and elevation of a target object according to claim 16 wherein a processing unit that is in communication with the primary radio transceiver and said at least three auxiliary radio receivers is provided to make the calculations and computations based on the timing data.

19. The method for determining the range, direction and elevation of a target object according to claim 16 wherein the step of selecting the arbitrary point $x_n$ is preceded by ascertaining which one of the three or more auxiliary radio receivers is nearest the target object; and the step of selecting the arbitrary point $x_n$ includes selecting a point on the sphere that is closest to the nearest auxiliary radio receiver.

20. The method for determining the range, direction and elevation of a target object according to claim 16 further comprising the steps of:

a. storing the determined position of the target object after the acceptable margin of error is reached; and b. re-checking the angle of the target object to the primary radio transceiver by beginning with the stored position of the target object instead of the arbitrary point in step (d).

\* \* \* \* \*